Dec. 6, 1960  C. S. VOELCKER  2,963,014
FUEL INJECTOR PUMP AND SYSTEM
Filed April 30, 1958  2 Sheets-Sheet 1

INVENTOR.
CARL S. VOELCKER
BY
ATTORNEYS

Dec. 6, 1960 C. S. VOELCKER 2,963,014
FUEL INJECTOR PUMP AND SYSTEM
Filed April 30, 1958 2 Sheets-Sheet 2
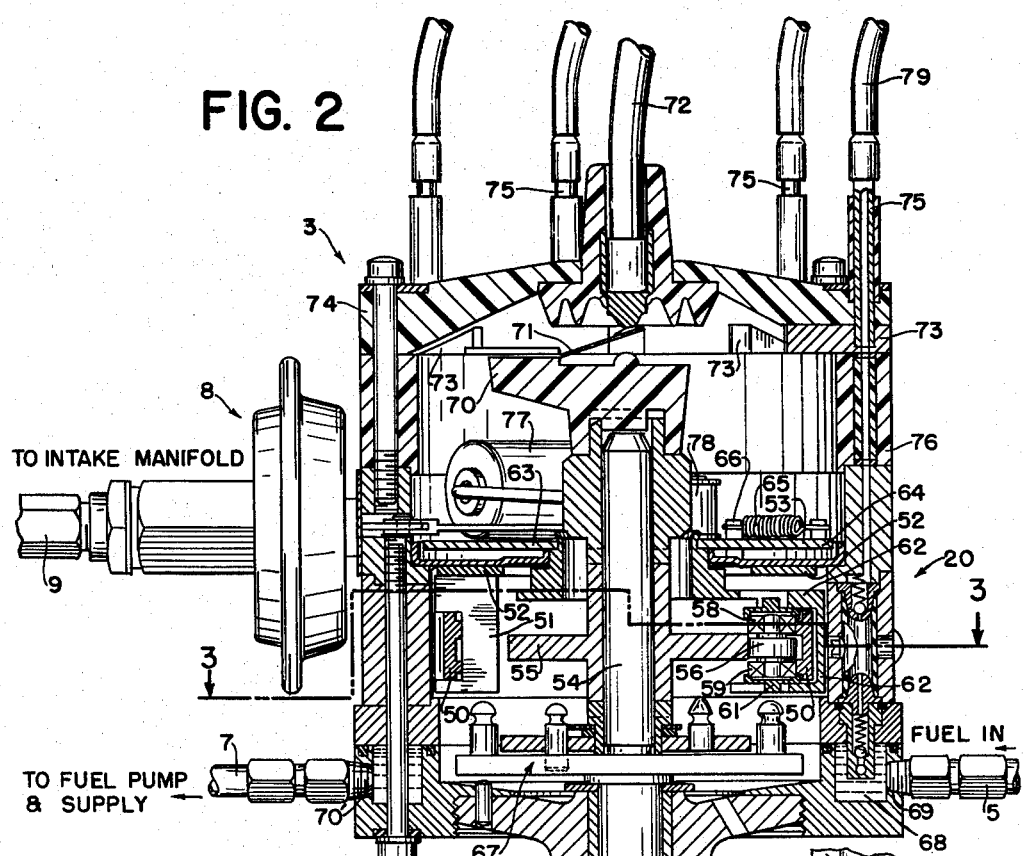
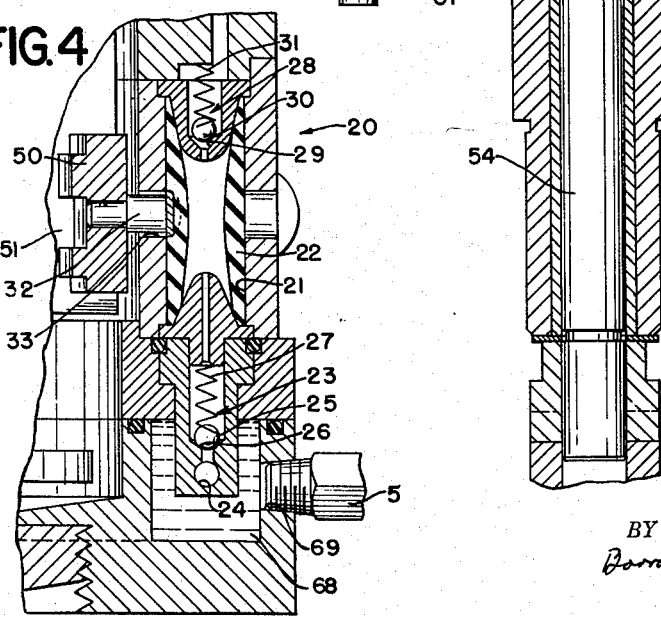
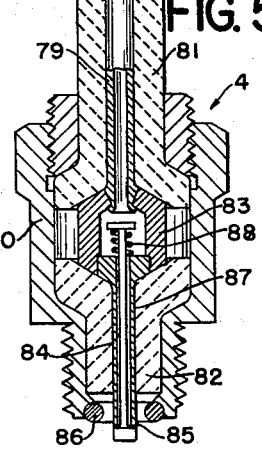
INVENTOR.
CARL S. VOELCKER
BY
ATTORNEYS

United States Patent Office 2,963,014
Patented Dec. 6, 1960

2,963,014

FUEL INJECTOR PUMP AND SYSTEM

Carl S. Voelcker, 52 Duck Pond Road, Glen Cove, N.Y.

Filed Apr. 30, 1958, Ser. No. 732,048

5 Claims. (Cl. 123—139)

This application relates generally to a fuel injector pump and system and more particularly to a new novel pump which may be combined with a distributor to utilize the fuel conduits leading from the distributor to the combustion chamber of an internal combustion engine, as a means for conducting a spark to the combustion chamber.

An advantage of fuel injector pumps and systems for imparting fuel to an internal combustion engine over the conventional carburation system of vaporizing the fuel, is that there may be a more accurate control of the exact amount of fuel which should theoretically be admitted to the combustion chambers of the internal combustion engine to insure highest operating efficiency. In some fuel injection systems, the fuel pump injects metered quantities of fuel directly into the intake manifold of the engine which results in a loss of efficiency, as a considerable amount of fuel is dissipated before reaching the combustion chamber.

In other systems the injector pump is normally separated from the distributor so necessitating a separate timing means for insuring that the proper amount of fuel is injected into the proper combustion chambers. The injector pump itself sometimes consists of a piston which slides directly in a close fitting cylinder containing gasoline and which when moved, forces a metered quantity of gasoline from the cylinder to a particular atomizing jet. This method of pumping has inherent difficulties in that the piston must be lubricated with oil so that it may slide in the cylinder and both the piston and cylinder must be machined to a high degree of tolerance. The oil is then free to mix with the gasoline being injected through the jets so that there is an actual oil-gasoline mixture being burned in the combustion chamber. The result of burning oil in a combustion chamber is that carbon and other undesirable deposits will quickly build up in the combusion chamber to foul the jets, the electrodes of the spark plug and to change the compression ratio of the combustion chamber. The position pumps are also adversely affected by back pressure exerted on the fuel due to the characteristics of gasoline and have not been used successfully in injectors during the compression or combustion portion of the engine cycle.

Still other fuel injector systems have heretofore employed separate spark plugs and jets which complicate the theoretical configuration of the combustion chamber and subsequent even burning of the mixture inside of the chamber. Likewise, separate fuel lines extended from the atomizing nozzles to the fuel pump itself while still other separate lead lines extended from the spark plug to the distributor so adding to the complexity of the system.

I overcome the aforementioned difficulties by providing generally for a fuel pump which may be combined with a distributor and which may utilize the fuel lines extending from the pump to the individual cylinders of the internal combustion engine as a means for also carrying the spark from the distributor to the spark plug. The spark plug itself is combined with the atomizing jet so that the jet will serve as an electrode of the spark plug.

Broadly, I provide for the fuel pump itself to comprise a housing in which there is a bore of predetermined size for each cylinder of the engine and which has confined therein a tube or pumping chamber made of a resilient, incompressible elastomer having flow characteristics, such as Buna N or other synthetic rubber. A movable plunger extends through a wall of the bore to intermittently engage the pumping chamber or tube so that the same may be depressed inwards. Spring urged check valves are provided at either end of the tube to control the admission and emission of fuel therefrom. By having the chamber or tube closely confined by the bore, the plunger and by both check valves, it is possible by moving the plunger a predetermined distance to depress the wall of the tube a predetermined amount utilizing the flow characteristics of an incompressible elastomer or any other incompressible material having flow characteristics in which the resiliency inherent in an elastomer may be induced by mechanical or other means. Since the material comprising the tube is incompressible, the fuel which is inside of the chamber must be forced out through the outlet check valve as the liquid fuel is also incompressible.

The plunger is moved intermittently by means of a cam which is attached directly to a motor driven distributor drive shaft which extends through the housing. One end of the housing has mounted thereon a distributor through which pass conduits extending to each of the outlet check valves. The conduits are made of a conductor material, such as copper, and pass through the center of a spark plug into each combustion chamber. An atomizing nozzle is mounted on the end of each conduit and serves as an electrode for the spark plug while the conduits themselves serve as leads for bringing the spark to the plugs from the distributor. Fuel passes through the conduits to the atomizing nozzles.

The end of the housing opposite the distributor has thereon a fuel intake reservoir one end of which is connected to a fuel tank and the other end to the suction side of an engine driven fuel pump. The inlet check valves extend down into the reservoir so that they are always below the level of fuel therein. The admission of fuel to the reservoir is such that it is always greater than the total capacity of fuel that may pass through the inlet check valves which will result in some fuel always being recirculated back to the fuel tank through the engine driven fuel pump. This positioning of the inlet check valves and limitation of their capacity promotes a continuous bleeding and cleaning action to cause debris, vapor and air bubbles to be drawn back to the main fuel tank since bubbles will rise to the top of the reservoir and debris will settle toward the bottom.

In addition, means dependent upon the vacuum in the intake manifold of the engine are provided which will regulate the stroke of the plunger and subsequent metering of the fuel from the pumping chamber. In this way, proper metering of the exact amount of fuel to be delivered to each combustion chamber is insured under all engine operating conditions.

In order to more fully understand the invention, reference is now made to the drawings in which a preferred embodiment of the invention is illustrated and in which:

Fig. 2 is a sectional view of my novel injector pump shown combined with a distributor;

Fig. 4 is an enlarged view of a portion of the pump assembly of Fig. 2 taken along lines 4—4 of Fig. 3, and Fig. 5 is a cross-sectional view of a spark plug adapted to be used in the engine as shown in Fig. 1.

Figure 1:
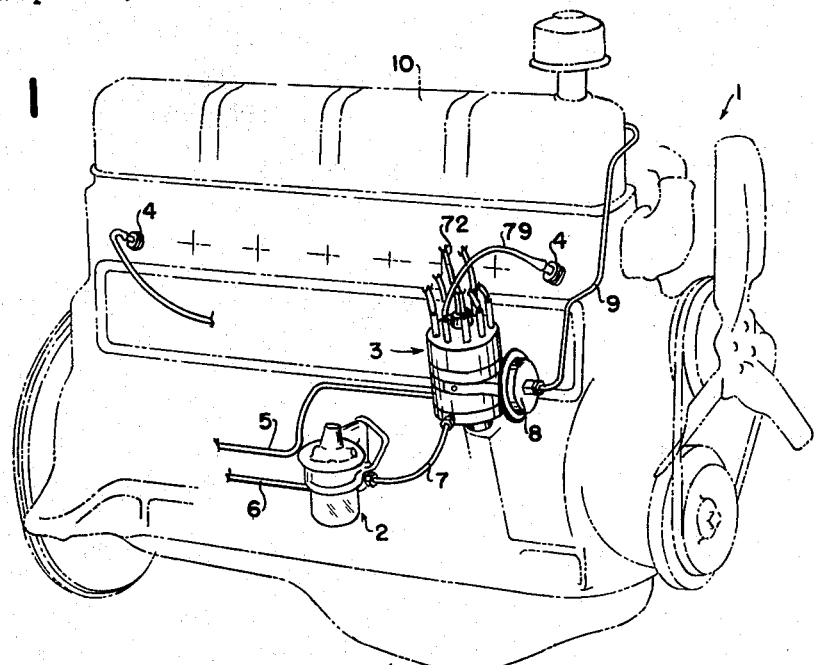
Fig. 1 is a perspective view of an internal combustion engine showing the placement of my novel fuel injection system with relation to the engine parts.

Referring to the drawings in detail and specifically to Fig. 1, 1 denotes generally an internal combustion engine having an engine driven fuel pump 2, a combined injector pump-distributor 3, and spark plugs 4 leading into conventional combustion chambers not shown. Fuel line 5 leads from a fuel tank not shown, to injector pump 3, while line 6 leads from the engine driven fuel pump 2 back to the fuel tank. Line 7 connects the injector pump 3 with the suction side of the engine driven pump 2. A diaphragm unit 8 is connected by line 9 to intake manifold 10.

Referring to Figs. 2 and 4 where the details of the injector pump are shown, 20 denotes generally a housing having therein a series of bores 21 of predetermined size. It is to be understood there is a separate bore for each cylinder of the engine, but for clarity, the details of only one have been shown.

Fitted into each bore 21 is a pumping chamber or tube 22 having an inside diameter of predetermined size and an outside diameter equal to bore 21. Tube 22 is made of a resilient, incompressible elastomer having flow characteristics. I have found that some synthetic rubbers, such as Buna N, have these properties. Natural rubber is unsatisfactory since it will deteriorate in gasoline.

A normally closed spring urged check valve 23 comprising an inlet 24, a ball check 25, seat 26 and spring 27 is inserted in the end of tube 22 to control admission of fuel therein. A normally closed spring urged check valve 28 comprising a seat 29, ball 30 and spring 31 is inserted in the other end of tube 22 to control emission of fluid therefrom.

A movable plunger 32 is adapted to be moved through hole 33 in the side of bore 21 by means described hereinafter to move the side walls of tube 22 inwards. It is seen from Fig. 4 that tube 22 is fully confined on the outside by bore 21, check valves 23 and 25 and plunger 32. It is apparent that if tube 22 be made of a resilient, incompressible elastomer having flow characteristics, and if plunger 32 moves the side wall of the tube inwards, that the only space in which the incompressible material comprising the tube may move or flow is towards the center which will then reduce the internal volume of the tube. If there is in turn an incompressible fluid inside the tube the fluid will have to be forced out some place, which in this instance is out through check valve 28. In effect, the resilient, incompressible elastomer might itself be thought of as an incompressible fluid separate from the fuel which it surrounds that always must flow to fill a constant volume in the confined space determined by the bore, plunger and two check valves.

By this construction, the tolerance in fitting of the plunger through hole 33 need not be close since the problem of leakby is not present. Neither is there a problem of lubricating the plunger nor the attendant difficulties of having oil mixing with the fuel injected into the combustion chamber. The precise amount of fuel will be the same on every injection provided that the stroke of the plunger is constant.

I am aware of Patent No. 1,976,415 in which there is disclosed an injector pump having a plunger engaging a portion of a flexible metal tubing to pump fuel therefrom. However, the principles of operation there are different from those I have disclosed since the metal tubing is not shown or confined by any outside housing, nor could it be considered as a resilient, incompressible elastomer having flow characteristics. An unconfined metal tube compressed at one point will merely deflect at another point so making precise metering of a predetermined amount of fluid from the tube due to a predetermined stroke of plunger engaging the tube impossible to obtain.

Figure 3:
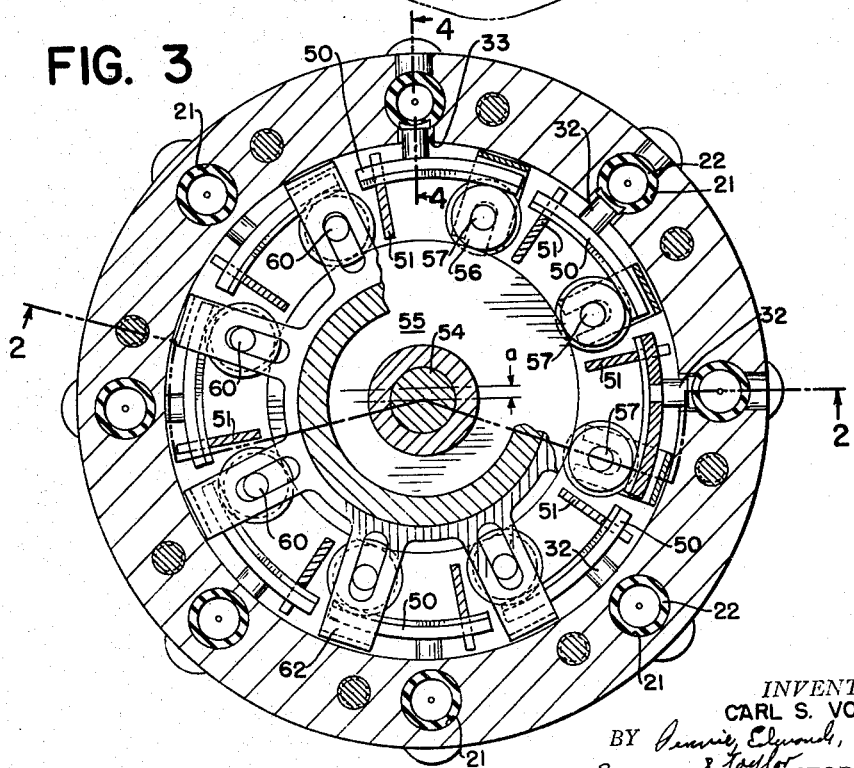
Fig. 3 is a cross-sectional view of Fig. 2 taken along lines 3—3.

Plunger 32 is attached to a sector plate 50 as shown in Figs. 3 and 4, a series of which are placed concentric with the housing so that each plunger may bear on each pumping chamber or tube 22. Each sector plate 50 bears on and is carried by a depending portion 51 of a heel plate 52. As seen in Fig. 2, heel plate 52 is in turn connected by screws (not shown) to a breaker plate 53, which is held rigidly with respect to housing 20.

An engine driven distributor drive shaft 54 extends through the center of the housing and is geared to the drive shaft of the internal combustion engine 1. A circular cam 55 is mounted eccentrically on drive shaft 54 and is offset a distance equal to "a" as seen in Fig. 3, in order that as the drive shaft rotates pressure may be brought against rollers 56, the shafts 57 of which are held by ball bearings 58 and 59. Bearings 58 and 59 in turn are held by bearing end caps 60 and 61 which are slidable in metering bracket 62.

It is seen by reference to Fig. 3 that as cam 55 rotates it will bear on the separate rollers 56 in the same order as the direction of rotation of the shaft. Thus assuming the shaft is rotating in a clockwise direction, it is apparent that the top roller will have the most pressure brought against it, with the pressure decreasing on the rollers going in a clockwise direction. The bottom roller, of course, has the least pressure on it.

The rollers themselves bear on the sector plates 50 to cause them to pivot about depending portions 51 of the heel plates 52 to force plungers 32 against the side walls of the tubes 22. As previously described, the inner volume of tubes 22 will be decreased thus forcing fuel out through outlet check valves 28.

The elastic properties of the material comprising tubes 22 will return the plungers 32, sector plates 50, and rollers 56 to the position as shown at the bottom of Fig. 3. Fuel pressure will then depress ball 25 against the bias of spring 27 to unseat valve 26 and allow entry of fuel into the pumping chamber or tube 22.

The stroke of plunger 32 may be varied in order to compensate for different fuel requirements in the combustion chamber under different operating conditions, i.e. when the engine is running at full load, when fuel requirements are high as compared with running at no load or at an idling speed when fuel requirements are low.

This is achieved by having a diaphragm unit 8 connected by line 9 to the intake manifold 10 of the engine 1 so that as engine load is increased, it will cause a decrease in vacuum and so allow the diaphragm (not shown) to move to the right, as seen in Fig. 2. Link 63 which is connected to the diaphragm will then allow mounting plate 64 to rotate in a clockwise direction with the tension of spring 65 which is secured by post 66 to breaker plate 53. Mounting plate 64 is in turn secured to metering bracket 62 which is likewise moved in a clockwise direction as seen in Fig. 3. This in turn will move rollers 56 closer to the depending portion 51 about which the sector plates 50 pivot and so shorten the effective arm of sector plates 50. The result is that the stroke of plungers 32 will be greater thus increasing the metering of fuel to the individual chambers at higher engine loads. As engine load is decreased, the vacuum in the intake manifold is increased allowing spring 65 to return the various parts to the idling position, as shown in Fig. 3.

A conventional centrifugal spark advance system 67 is illustrated generally in Fig. 2. However, for clarity the details are not shown, since it is not a part of my invention. The effect of this system is to advance the spark as engine speed increases.

At the bottom of housing 20, I include a fuel reservoir 68 into which the various inlet check valves 23 depend. The reservoir has an inlet port 69 connected to line 5 leading from a fuel tank and an outlet port 70 connected to line 7 leading to the suction side of fuel pump 2. The inlet 24 of the valves 23 is located below the level of fuel in the reservoir so that any debris that may enter the manifold through conduit 5 will fall to the bottom below inlet 24 and any air bubbles contained in the fuel will rise to the top of the reservoir above inlet 24.

In order to further insure against any debris or bubbles being sucked in through the inlet check valves, I provide for more fuel to enter the reservoir than is, or may be removed through the inlet check valves. This is achieved by making the area of entrance port 69 of such size that its capacity is greater than the total capacity of all the inlet check valves.

In order to provide for a positive flushing action in the reservoir, the excess fuel is removed therefrom through outlet port 70' by the engine driven fuel pump 2 and returned to the fuel tank. The inlets 24 of the inlet check valves 23 are arranged so that these openings are parallel to the direction of flow through the reservoir which will result in continual flow through the inlet 24 further reducing the possibility of debris entering the inlet check valves.

A conventional distributor rotor 70 is mounted on top of distributor drive shaft 54 and has thereon a spring 71 which bears on lead 72. Lead 72 extends to the high tension side of a coil, not shown. Rotor 70 engages points 73 which are carried in distributor cap 74 made from an insulating material. Points 73 are connected electrically to conduits 75 which are made of a conducting material such as copper tubing. Conduit 75 in turn communicates through housing 20, with the outlet check valves 28 through means of a terminal insulator 76.

A condenser 77 is carried on the point mounting plate 64 along with the usual breaker assembly 78.

Conduits 75 extend through line 79 to the various spark plugs the details of which are illustrated in Fig. 5. The lines 79 may be flexible copper tubing which is covered by an insulation to prevent loss of strength of the spark transmitted to the spark plug.

The spark plug itself comprises an iron or steel plug 80 in which are placed ceramic insulators 81 and 82, separated by an annular part 83 which is made of a conductor material. Line 79 terminates in insulator 81 and is in electrical contact with part 83. A conduit 84 made of a conducting material extends from part 83 to the interior of the combustion chamber and its end 85 serves as one of the electrodes of the spark plug. The other electrode comprises an annular ring 86 secured to plug 80. The sparking gap is determined by the distance separating the two electrodes.

Conduit 84 also terminates in an atomizing nozzle the jets of which are opened when plunger 87 is forced down against the force of spring 88 by fuel pressure. The simple construction of plunger 87 allows it to be made of an extra hard material which usually does not make a good electrical conductor. However, in this instance, it matters little, since conduit 84 serves as the necessary conductor.

Spring 88 forces plunger 87 to a closed position when fuel pressure is not exerted on the plunger by action of the fuel injector pump. This prevents back pressure from being exerted on the lines 79 during the compression and power portions of the engine cycle. Even without the plunger 87, back pressure still would not be exerted on the pumping chamber of the injector pump because outlet valve 28 is normally closed and opened only when tube 22 is displaced.

By this arrangement of combining the spark plug and the atomizing nozzle, the combustion chamber will have fewer sharp corners than a conventional chamber employing separate spark plugs and atomizing nozzles. This is an important feature, particularly in modern high compression engines, since sharp corners tend to prevent even burning of the fuel air mixture and are apt to lead to detonation.

While I have shown my novel pump combined with a distributor and used to inject into the cylinders of a spark ignited engine, it is obvious that the same injector pump can be used to inject into the cylinders through separate nozzles, into the manifold through separate nozzles, and can be timed to inject at any point in the cycling of the engine which is found to be most efficient since it is so constructed as to be unaffected by back pressure and is equally adaptable for use on diesel engines.

The description which has been given, recites the details of a particular embodiment of the invention which is set forth as new and useful. However, it is obvious that different changes and modifications may be made, within the scope of the appended claims, without departing from the spirit of the invention.

I claim:

1. A fuel injector pump comprising a housing, a bore of predetermined size in said housing, a pumping chamber of predetermined size having resilient side walls of an incompressible, flowable elastomer, a fuel inlet in said housing, a normally closed spring biased inlet check valve interposed in said housing between said fuel inlet and said pumping chamber, a fuel outlet in said housing, a normally closed spring urged outlet check valve interposed in said housing between said fuel outlet and said pumping chamber, a movable plunger in said housing in contact with a side wall of said pumping chamber through a side of said bore, means for intermittently moving said plunger to displace said side wall, and said pumping chamber being completely confined by said bore, said inlet check valve, said outlet check valve and said plunger whereby displacement of said side wall of said pumping chamber due to movement of said plunger will cause said outlet check valve to open against the force of its spring and to force a predetermined amount of fuel in said pumping chamber out through said outlet check valve and through said fuel outlet, and whereby when said plunger is retracted, said side wall will return to its original shape as before displacement and said outlet check valve will close under the force of its spring and said inlet check valve will open under force of entering fuel to allow entry of fuel into said pumping chamber.

2. A fuel injector pump according to claim 1 having in addition means for varying the stroke of said plunger whereby the amount of fuel forced from said pumping chamber due to displacement of said side wall by said plunger may likewise be varied.

3. A fuel injector pump according to claim 1 having in addition a fuel intake reservoir in an end of said housing, a fuel entrance port in said reservoir extending to a source of fuel, and a fuel outlet port leading to the suction side of an engine driven pump, said engine driven pump forcing fuel to said reservoir from a source; said fuel inlet extending into said reservoir below the level of fuel therein and the capacity of said fuel inlet being smaller than the capacity of said fuel entrance port so that a portion of said fuel in said reservoir is continually drawn through said reservoir past said fuel inlet to be circulated back to said engine driven pump.

4. A fuel injector pump comprising a housing; a series of bores of predetermined size in said housing; a pumping chamber of predetermined size for each said bore; each said pumping chamber comprising a tube of a resilient, incompressible, flowable elastomer completely confined by the sides of a bore; a spring urged inlet check valve attached to one end of each said tube and the spring of which normally holds the inlet valve closed; a spring urged outlet valve attached to the other end of each said tube and the spring of which normally holds the outlet valve closed; a series of movable plungers, each of said plungers extending through the side walls of a bore to intermittently displace a portion of a tube confined therein; and an engine driven cam for intermittently moving each of said plungers against a tube to force a predetermined amount of fuel therefrom.

5. A fuel injector pump according to claim 4 having in addition an intake fuel reservoir, an inlet port in said reservoir extending to a source of fuel, and an outlet port in said reservoir extending to the suction side of an engine driven pump; each of said inlet check valves extending into said reservoir below the level of fuel carried therein and the total intake capacity of said tubes and intake check valves being less than the intake capacity of said inlet port and said engine driven pump whereby fuel always flows to the suction side of said engine driven pump.

References Cited in the file of this patent

UNITED STATES PATENTS

| | | |
|---|---|---|
| 1,223,124 | Thompson | Apr. 17, 1917 |
| 1,976,415 | Scott | Oct. 9, 1934 |
| 2,285,974 | Huber | June 9, 1942 |
| 2,369,134 | Cameron | Feb. 13, 1945 |
| 2,441,277 | Lamphere | May 11, 1948 |
| 2,624,284 | Straub | Jan. 6, 1953 |
| 2,648,288 | Marks | Aug. 11, 1953 |
| 2,871,846 | Zimmerman | Feb. 3, 1959 |

FOREIGN PATENTS

| | | |
|---|---|---|
| 776,175 | France | Oct. 31, 1934 |